United States Patent Office 3,590,065
Patented June 29, 1971

---

3,590,065
METHOD OF PREPARING MERCAPTO-ALKYLALKOXY SILANES
Joseph A. Rakus, Freeland, and James G. Sharpe, Midland, Mich., assignors to Dow Corning Corporation, Midland, Mich.
No Drawing. Filed July 18, 1969, Ser. No. 843,205
Int. Cl. C07f 7/18
U.S. Cl. 260—448.8R
4 Claims

ABSTRACT OF THE DISCLOSURE

Mercaptoalkylalkoxy silances are prepared by the simultaneous reaction of chloroalkylalkoxy silanes, thiourea or tetramethyl thiourea and ammonia, at a temperature of 100 to 145° C. The reaction is characterized by excellent yields of the desired mercaptoalkylalkoxy silanes without the necessity of using solvent and without the formation of undesired by-products. For example, chloropropyl-trimethoxysilane is reacted with thiourea and ammonia at 125° C. to produce mercaptopropyltrimethoxysilane and guanidine hydrochloride.

---

There is a growing demand for mercaptoalkyltrialkoxy silanes as coupling agents between siliceous substrates and various organic resins, particularly of the diene type. Heretofore, one of the best methods of preparing such materials involves the process shown in U.S. Patent 3,314,982, in which isothiuronium salts were decomposed in the presence of a base to give the mercaptoalkylsilane, cyanamide and the chloride of the base. The isothiuronium salts were prepared by reacting chloroalkylalkoxy silane with thiourea. As can be seen, this method involves a two-step process in going from the chloroalkylalkoxysilane to the mercaptoalkylalkoxy silane.

Also in practical operation this method requires the presence of a solvent in order to handle the vast amount of salt formed. It has been found that when the process of this patent is employed with the isothiuronium salts of chloropropyl alkoxysilanes, undesirable reactions occur during the decomposition of the salt to give highly odiferous materials and a dark color. Finally, it is necessary to remove the solvent from the reaction mixture in the patented process.

In accordance with this invention, however, the process is a one-step operation employing no solvent and giving no undesirable odiferous by-products, even when the chloropropylalkoxysilanes are employed as a starting material. It is evident from the above that the process of this invention does not involve the formation of a thiuronium salt, even as a transitory intermediate in the process. All attempts to find such a product during the process have proved to be futile. It is believed that the reaction of this invention proceeds by the following mechanism, although, of course, the invention is not limited to any such explanation.

The thiourea reacts with the ammonia to form the one-to-one thiourea ammonia complex which reacts at once with the haloalkylsilane to form the mercaptan and guanidine hydrochloride. This procedure can be represented by the reaction $H_2N(S=)CH_2+NH_3 \rightarrow H_3N^+C(NH_2)_2S^-$
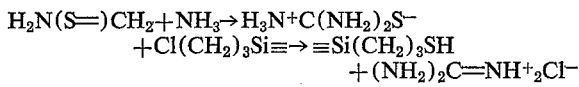

As can tbe seen the presence of ammonia prevents the formation of the isothiuronium salt.

It is the object of this invention to provide a more feasible method for the preparation of mercaptoalkylalkoxy silanes.

This invention relates to the method comprising reacting (1) a compound of the formula $(RO)_xR'_{3-x}SiR''X_y$ with $(R'''_2N)_2C=S$ and ammonia at a temperature of from 100 to 145° C. there being unreacted ammonia present at least until essentially all of (1) has reacted, whereby a compound of the formula (2) $(RO)_xR'_{3-x}SiR''(SH)_y$ is obtained, in which compounds (1) and (2) R is a lower alkyl radical or a lower alkoxyalkyl radical, R' is a hydrocarbon radical free of aliphatic unsaturation or a $R_fCH_2CH_2—$ radical, where $R_f$ is a perfluoroalkyl radical, $x$ is an integer from 1 to 3, X is chlorine or bromine, R" is a hydrocarbon radical free of aliphatic unsaturation having a valence of $y+1$, in which the X's are attached to aliphatic or cycloaliphatic carbon atoms, which are at least beta- to the silicon, R''' is hydrogen or methyl, and $y$ is an integer from 1 to 2.

In carrying out the reaction best yields are obtained when the three reactants are employed in at least stoichiometric amounts. That is, it is best to use at least one mol of thiourea and one mol of ammonia for every X group in the reaction. It is often desirable to employ a slight excess of thiourea since this facilitates the separation of the mercaptosilane from the guanidine hydrochloride. The temperature at which the reaction is carried out is critical and should be in the range of 100 to 145° C. with the best results obtained within the range of 120 to 130° C. The order of addition of reactions is not critical, although the best method of carrying out the reaction is by mixing the thiourea with the chloroalkylalkoxy silane and then adding ammonia to the mixture. In any event, there should be ammonia present until essentially all haloalkylsilane has been converted to the mercaptan.

For the purpose of this invention R can be any lower alkyl radical such as methyl, ethyl, isopropyl, butyl, or octyl; or any lower alkoxyalkyl radical such as beta-methoxyethoxy, beta-ethoxyethoxy or —$OCH_2CH_2OCH_2CH_2OMe$ R' can be any monovalent hydrocarbon radical such as methyl, ethyl, propyl, octadecyl, cyclohexyl, cyclopentyl, phenyl, tolyl, xylyl, xenyl, beta-phenylethyl, beta-phenylpropyl, or benzyl. R' can also be any $C_fCH_2CH_2—$ radical, in which $R_f$ is any perflouoroalkyl radical such as trifluoropropyl, perfluorobutyl, perfluoroisobutyl or perfluorooctadecyl.

R" can be any hydrocarbon radical in which the halogen atom is at least on the beta-carbon atom [1] with respect to the silicon and is attached to a non-aromatic carbon atom. R can be divalent or trivalent, depending upon the number of X groups therein. Examples of R" radicals which are operative herein are dimethylene, octadecamethylene, cyclohexylene, —$C_6H_4CH_2—$,

—$CH_2CH_2C_6H_4CH_2CH_2—$

—$CH_2CH_2CHCH_2—$ or —$CH_2CH_2CHCH_2CH_2CH_2—$.

---
[1] That is the halogen cannot be on a carbon atom which in turn is attached to silicon (i.e. an alpha carbon).

The thiourea employed in this invention can be thiourea itself, tetramethyl thiourea or thiourea having both methyl and hydrogen atoms or the nitrogen atoms.

and ammonia in accordance with the procedure of Example 1, the following mercaptosilanes are obtained.

| Silane | Mercaptosilane |
|---|---|
| $Br(CH_2)_3Si(Me_2)OEt$ | $HS(CH_2)_3Si(Me_2)OEt$ |
| $ClC_6H_{10}Si(OCH_2CH_2OMe)_3$ | $HSC_6H_{10}Si(OCH_2CH_2OMe)_3$ |
| $ClC_{18}H_{36}Si(OCHMe_2)_3$ | $HSC_{18}H_{36}Si(OCHMe_2)_3$ |
| $(ClCH_2CHClCH_2)CH_2PhSi(OC_6H_{13})_2$ | $(HSCH_2CH(SH)CH_2CH_2)PhSi(OC_6H_{13})_2$ |
| $(ClCH_2CH_2)C_{18}H_{37}Si[(OCH_2CH_2)_2OMe]_2$ | $(HSCH_2CH_2)C_{18}H_{37}Si[(OCH_2CH_2)_2OMe]_2$ |
| $ClCH_2C_6H_4Si(OMe)_3$ | $HSCH_2C_6H_4Si(OMe)_3$ |
| $Cl(CH_2)_3(CF_3CH_2CH_2)Si(OMe)_2$ | $HS(CH_2)_3(CF_3CH_2CH_2)Si(OMe)_2$ |
| $ClCH_2CH_2C_6H_4CH_2CH_2Si(OMe)_3$ | $HSCH_2CH_2C_6H_4CH_2CH_2Si(OMe)_3$ |
| $Cl(CH_2)_3(C_6H_5CH_2CH_2)Si(OMe)_2$ | $HS(CH_2)_3(C_6H_5CH_2CH_2)Si(OMe)_2$ |

The following examples are illustrative only and should not be construed as limiting the invention which is properly delineated in the appended claims. The following abbreviations are used herein: Me for methyl, Et for ethyl and Ph for phenyl.

EXAMPLE 1

1350 g. of thiourea and 3000 g. of 3-chloropropyltrimethoxysilane were placed in a vessel and the agitator was started and ammonia was passed into the mixture so that a minimum of 2 cc. per second of the gas came out of the reactor. Agitation was continued and the temperature of the reaction was maintained by external heating at 120° C. After 2 hours and 15 minutes external heating was removed and the reaction maintained 122° C. for one hour. Heating was then reapplied for additional 6 hours. The reaction mixture was then allowed to settle and the upper layer of mercaptopropyltrimethoxysilane was removed from the reaction vessel. The yield of 3-mercaptopropyl-trimethoxysilane was 99.5%.

EXAMPLE 2

1825 g. of 3-chloropropylmethyldimethoxysilane, 836 g. of thiourea and 150 g. of guanidine hydrochloride were mixed in a reaction vessel. The stirrer was started and ammonia was passed thorough as in the case of Example 1. The reaction time was 7 hours at at temperature of 120° C. The yield of 3-mercaptopropylmethyldimethoxysilane was 93%.

EXAMPLE 3

A mixture of 19.85 g. of 3-chloropropyltrimethoxysilane and 13.2 g. of 1,1,3,3-tetramethyl-2,2-thiourea and ammonia were reacted in accordance with procedure of Example 1. On cooling the reaction mixture there was obtained a 90% yield of 3-mercaptopropyltrimethoxysilane.

EXAMPLE 4

When the following silanes are reacted with thiourea

That which is claimed is:
1. The method comprising reacting
   (1) a compound of the formula $(RO)_xR'_{3-x}SiR''X_y$ with $(R'''_2N)_2C{=}S$ and ammonia at a temperature of from 100 to 145° C., there being unreacted ammonia present at least until essentially all of (1) has reacted whereby a compound of the formula,
   (2) $(RO)_xR'_{3-x}SiR''(SH)_y$ is obtained in both compounds (1) and (2),
   R is a lower alkyl radical or a lower alkoxyalkyl radical,
   R' is a hydrocarbon radical free of aliphatic unsaturation having a valence of $y+1$, which the
   $R_f$ is a perfluoroalkyl radical,
   $x$ is an integer from 1 to 3,
   X is chlorine or bromine,
   R'' is a hydrocarbon radical free of aliphatic unsaturation having a valence of $y+1$, in which the X's are attached to aliphatic or cycloaliphatic carbon atoms, which are at least beta- to the silicon,
   R''' is hydrogen or methyl, and
   $y$ is an integer from 1 to 2.
2. The method in accordance with claim 1 in which ammonia is added to a mixture of (1) and the thiourea.
3. The method in accordance with claim 1 in which (1) is 3-chloropropyltrimethoxysilane.
4. The method of claim 3 in which the temperature is from 120 to 130° C.

References Cited

UNITED STATES PATENTS

| 3,314,982 | 4/1967 | Koerner et al. | 260—448.2N |
| 3,392,182 | 7/1968 | Koerner | 260—448.8R |
| 3,440,302 | 4/1969 | Speier et al. | 260—448.8RX |
| 3,465,015 | 9/1969 | Speier | 260—448.2N |

JAMES E. POER, Primary Examiner

P. F. SHAVER, Assistant Examiner

U.S. Cl. X.R.

260—448.2N, 448.2E